Jan. 21, 1947.  W. H. FORMHALS ET AL  2,414,516
CONTROL SYSTEM
Filed May 30, 1944
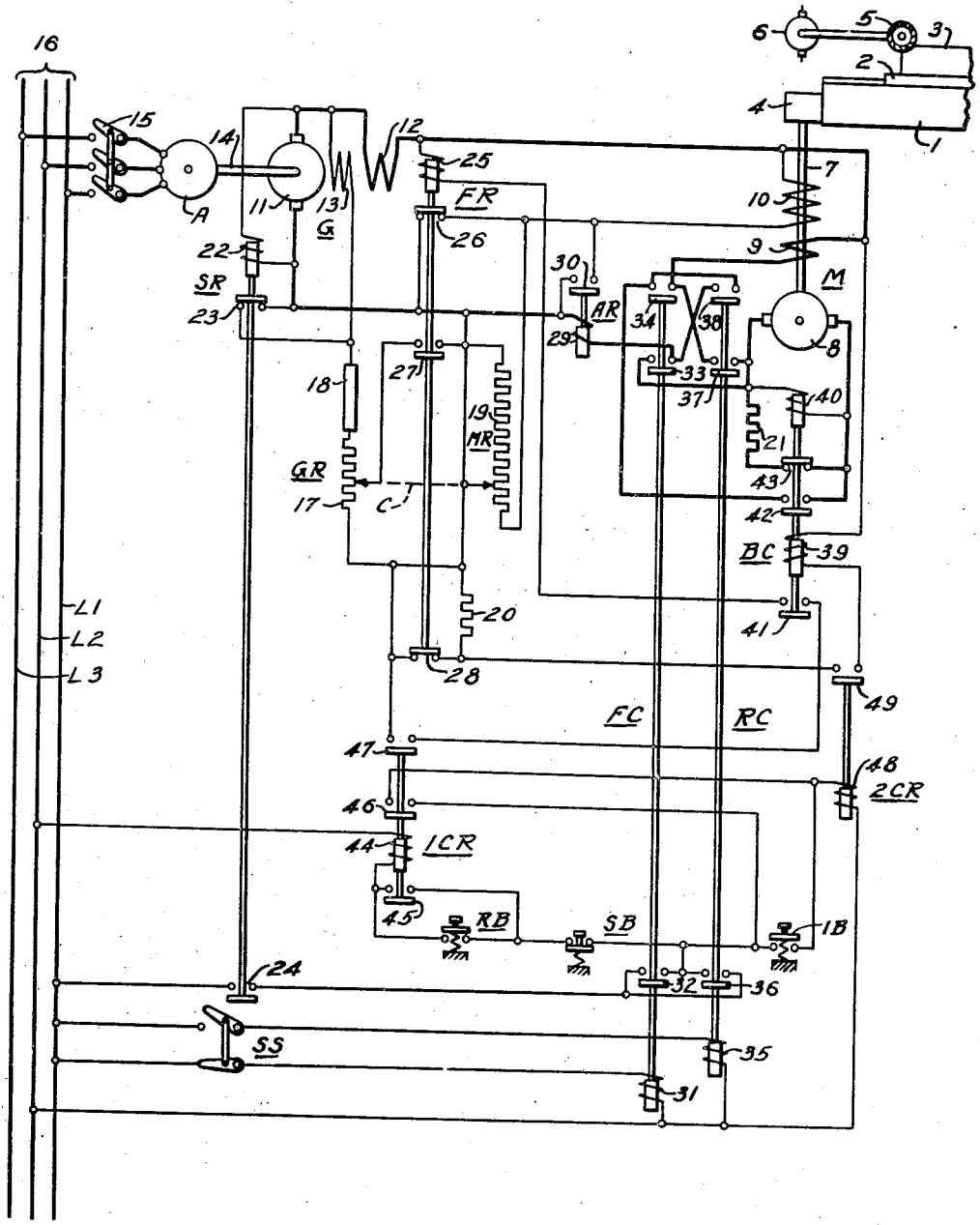
WITNESSES:
INVENTORS
William H. Formhals and
George E. King.
BY
ATTORNEY Patented Jan. 21, 1947

2,414,516

UNITED STATES PATENT OFFICE 2,414,516

CONTROL SYSTEM

William H. Formhals, Forest Hills, and George E. King, Swissvale, Pa., assignors to Westinghouse Electric Corporation, East Pittsburgh, Pa., a corporation of Pennsylvania Application May 30, 1944, Serial No. 538,104

13 Claims. (Cl. 172—239)

Our invention relates, in general, to controls for variable voltage drives whose motor is energized by a self-excited adjustable voltage generator, and more in particular to variable voltage controls for machine tools that require a reversing, braking and inching operation.

It is an object of our invention to provide a drive of the type just mentioned which affords the performance of reversing, braking and inching operations without necessitating a starting and stopping of the generator at the beginning and end of such operations.

Another object of the invention is to provide a variable voltage drive, having a self-excited generator for adjustable output voltage, which secures a proper building up of the generator voltage even if the voltage-adjusting rheostat is rated for a wide range of voltage control and set for the lowest voltages of this range.

These and other objects of our invention will be apparent from the following description of the circuit diagram of a machine tool feed drive shown in the drawing.

In the drawing, numeral 1 denotes the base or bed structure of a milling machine. The support 2 for carrying the workpiece 3 is slidably mounted on structure 1 for horizontal reciprocation relative thereto. A gear or transmission denoted by 4 is provided for driving the work support 2. The cutter or milling tool is indicated at 5; its driving motor is denoted by 6.

The driving gear or transmission 4 is controlled by a motor M with which it is connected by a shaft 7. The armature of drive motor M is denoted by 8, an appertaining series field (compensating) winding by 9 and a shunt field winding by 10. The motor M derives its electric energization from a generator G whose armature 11 is magnetically acted upon by a series field winding 12 (compensating winding) and a shunt field winding 13. The generator shaft 14 is connected with a motor A which is energized through a starting switch 15 or other suitable motor starting and control means from an alternating-current line 16 whose phase conductors are denoted by L1, L2 and L3. The motor A may be of any suitable type to secure a substantially constant operating speed.

The connection between generator G and motor M is controlled by a number of interconnected control devices and circuits which include two adjustable impedance means, i. e. a generator field rheostat GR and a motor field rheostat MR. The generator rheostat GR has a resistor 17 and a contact bar 18 connected in series relation and provided with a slider which is mechanically connected with the slider of the resistor 19 of the motor rheostat MR. The mechanical slider connection is represented schematically by the broken line marked C. The two sliders are adjustable along the respective stationary parts of the rheostats at the choice of the operator and serve to select the running speed of motor M. When the two sliders are moved in the upward direction, the effective resistance of both resistors 17 and 19 is changed simultaneously. When the slider of rheostat GR reaches the bar 18, no further change occurs in the resistance of the generator shunt field circuit while a further adjustment of the sliders in the upward direction continues to change the resistance in the shunt field circuit of motor M.

The circuit connections between generator and motor include further an auxiliary current limiting resistor 20 and a dynamic braking resistor 21. A selector switch SS is provided for selecting the running direction of the motor. This switch has a "forward" and "reverse" position and is under control by the operator. A normally open push contact RB, preferably a push button, serves to start the motor M and a normally closed push contact SB, such as a push button, is provided for stopping the motor. A push button contact IB normally open, serves for inching operations. Included in the control system are further a number of contactors or relays denoted by SR, FR, AR, FC, RC, BC, 1CR and 2CR whose purpose and arrangement will be described presently.

Relay SR serves as a voltage responsive control means. It has its control coil 22 connected across the generator armature 11 while its contact 23, when coil 22 is deenergized, short circuits the generator field rheostat GR thus placing the generator field winding 13 directly across the generator armature 11. As long as contact 23 is closed, the generator G, when driven at full speed, is in a condition for building its armature voltage up to its maximum value. The relay SR is adjusted so that it will pick up near the voltage maximum point. This causes contact 23 to open and to insert the maximum impedance, i. e. the entire resistance of the generator field rheostat GR into the circuit of shunt field winding 13, thereby causing the generator armature voltage to drop to its minimum working value. The dropout value of relay SR is set to be below this minimum voltage value so that the rheostat GR may control the value of generator output voltage over the entire desired operating range. In this manner, the voltage responsive relay SR secures always a proper building up of the generator voltage.

Relay FR has a control coil 25 for actuating three contacts 26, 27 and 28. When coil 25 is deenergized, all resistance of the generator field rheostat GR is inserted, under control of the above-mentioned relay SR, in the circuit of generator field winding 13 while all resistance of the motor field rheostat MR is short circuited at contact 26. When coil 25 is energized, the short circuit at 26 is removed and the slider circuit of rheostat GR closed at 27, thereby rendering both rheostats GR and MR effective in such a manner that the excitation of the generator and motor shunt fields depends on the selected setting of the two respective rheostats. Consequently, the generator voltage and, hence, the running speed of motor M are now dependent on this rheostat setting. Coil 25 of relay FR is energized only during the running operation of the motor but remains deenergized when the motor is at rest as well as during inching operation, as will be more fully explained hereinafter.

Relay AR represents a motor field accelerating relay. It has a control coil 29 connected in series relation with the motor armature 8. Contact 30 of relay AR, when closed, shorts out the motor shunt field rheostat MR whenever the motor armature current reaches a given strength above the rated full load value, for instance, 125% of this value. The relay is further adjusted so that contact 30 opens when the load current drops to a value slightly above full load. During acceleration by field weakening, the relay contact 30 closes and opens a number of times. In other words, the load responsive relay AR acts as a fluttering relay.

The contactors FC and RC are used for reversing the running direction of motor M and are controlled by the above-mentioned selector switch SS. Consequently, only one of these contactors is energized at a time. Contactor FC has a coil 31 energized when switch SS is in the illustrated "forward" position. Coil 31 controls an interlock contact 32 and two main contacts 33 and 44. Similarly, relay RC has its coil 35 energized when switch SS is in the "reverse" position and is provided with an interlock contact 36 and two main contacts 37 and 38. It will be understood that the reversing contactors FC and RC and the appertaining selector switch SS (as well as the contactor BC) could be replaced by a master controller of the drum switch type whose contacts serve to directly reverse the polarity of the motor armature circuit. Another possibility of reversing the motor is to provide "forward" and "reverse" push button contacts instead of switch SS and contactors FC and RC. These different possibilities of modifying the control scheme are well known as such, and hence not illustrated, their specific design does not form part of an invention proper.

The contactor BC serves to control the dynamic braking operation of motor M. Contactor BC is a single-pole double-throw contactor whose contact assembly is movable between two positions by means of two coils 39 and 40, respectively. The assembly is biased toward the illustrated position and coil 40 increases this bias when energized by the counterelectromotive force generated by the armature 8 when the motor is running. Coil 39 serves to move the contact assembly against its bias but functions in this manner only when coil 40 is sufficiently deenergized, i. e. the motor substantially at rest. Similarly, coil 40 is not strong enough to return the assembly into the illustrated dropped off position if coil 40 has picked up the assembly and remains energized. The contact assembly of braking contact BC has three contacts denoted by 41, 42 and 43. The coil 39 is designed to close contacts 41 and 42 and to open contact 43 at the minimum generator voltage. Contact 43, when closed, connects the braking resistor 21 across the motor armature 8. The above-mentioned resistor 20 is series connected with coil 39 and short circuited by the interlock contact 28 of relay FR as long as the latter is in dropped-off condition. Resistor 20 serves to protect coil 39 of relay BC when the generator voltage is raised to increase the motor speed.

The operation of the drive system as a whole is as follows:

If switch SS is set for forward operation, as shown in the drawing, the supply of energization to line 16 causes the contactor FC to be energized from mains L1 and L2 through switch SS and coil 31. Contactor FC closes its main contacts 33 and 34, thereby preparing the armature and series field circuit of motor M for operation in the forward running direction. However, armature 8 and field winding 9 remain deenergized because their circuit extends through contact 42 of contactor BC which is open at this stage of operation.

When now motor A is started by closing the starter 15, the generator G starts generating an armature voltage which is effective in coil 22 of relay SR. At first coil 22 is not sufficiently energized to open contact 23. Consequently, the shunt field winding 13 of the generator is connected directly across the armature 11 while the rheostat GR has minimum or zero impedance and is ineffective. The shunt field winding 10 of motor M is also connected across the generator armature, because rheostat MR is shorted out of the load circuit at contact 26. Under these conditions of minimum impedance in both shunt field circuits, the generator voltage builds up toward its maximum. With the generator at full speed and the generator voltage near maximum, relay SR picks up and, by opening contact 23, connects the generator field rheostat GR in series with field winding 13. Since the full impedance of rheostat GR is effective in this circuit, the generator voltage is now reduced to the minimum working value.

Contact 24 of relay SR closes simultaneously with contact 23 and prepares an energizing circuit for control relays 1CR and 2CR through the closed contact 32 of contactor FC. However, relays 1CR and 2CR remain deenergized as long as neither button RB or IB is depressed. With the generator G thus ready for operation, the motor M remains stopped because, as mentioned, its armature circuit is still open at contact 42 of contactor BC.

In order to operate motor M, button RB is depressed. This causes control relay 1CR to pick up, since its coil 44 is now energized in a circuit extending from L2 through the elements 44, RB, SB, 32, 24 to L1. Relay 1CR seals itself in at contact 45, so that it stays energized when button RB is subsequently released. Contact 46 closes and energizes relay 2CR through L2, 48, 46, 32, 24, L1. Contact 49 of relay 2CR closes and energizes coil 39 of braking relay BC by generator direct current. Contact 42 of contactor BC is now closed and completes the armature circuit of motor M, so that the motor is started at the minimum operating voltage of the generator as determined by the full (maximum) impedance of GR. Interlock contact 41 of contactor BC closes also and energizes coil 25 of relay FR. Contact 26 opens and contact 27 closes, thereby inserting resistor 19 of rheostat MR into the circuit of motor field winding 10. Hence, the motor M accelerates to the operating speed as set by rheostat MR. This speed can be adjusted by shifting the slider assembly of the rheostats to any value within the available operating range. During the acceleration of motor M, the fluttering relay AR is effective as described above.

In order to stop the motor, the stop button SB is depressed. This breaks the circuit of coil 44, so that relay 1CR drops off. This, in turn, opens the circuit of coil 48 at contact 46, so that relay 2CR is likewise deenergized. The opening of contact 49 in relay 2CR interrupts the circuit of coil 39. The coil 40, energized by the counter-electromotive force generated in the motor armature 8, causes contact 43 to close and contacts 41 and 42 to open as soon as the motor has nearly stopped. As a result, the armature circuit of the motor is interrupted at contact 42, and coil 25 of relay FR is deenergized due to the opening of contact 41. At the same time, the resistor 21 is connected across the motor armature to provide dynamic braking.

With the motor stopped and the generator in operating condition, as described previously, the actuation of button IB serves to perform inching operations. The closure of the contact at button IB passes current through coil 48 of relay 2CR in circuit L2, 48, IB, 32, 24, L1, so that contact 49 of relay 2CR is closed. Contactor BC picks up through 39, 49, and 28, so that contact 42 closes and completes the motor armature circuit. The motor now operates at the minimum running speed as determined by the full impedance of resistors 17 and 19, because relay FR cannot pick up since relay 1CR is deenergized and contact 47 opened. When button IB is released, relay 2CR drops out so that the opening of its contact 49 causes the brake contactor BC to open contact 42 and close contact 43, thereby connecting resistor 21 across armature 8 for dynamic braking.

In order to perform the above described operations in the reverse running direction of motor M, switch SS is placed in the reverse position. In this position, contactor FC remains deenergized while contactor RC closes contacts 36, 37 and 38, thereby reversing the polarity of the generator current in the circuit of motor armature 8. The other control connections described in the foregoing remain substantially unchanged except that the contactor RC, its coil and contacts take the place of contactor FC and its corresponding parts.

The energizing coils 44 and 48 of relays 1CR and 2CR, respectively, are interlocked with relay SR at contact 24. This insures that the generator voltage has built up before the motor M can be operated. If for any reason the generator voltage should collapse while the generator is running, relay SR drops out and disconnects the coils of relays 1CR and 2CR. This, in turn, causes contactor BC to drop out and to disconnect the motor M from the generator while connecting the dynamic braking resistor 21 across the motor armature. In this manner, the load is removed from the generator, and contact 23 of relay SR short circuits the generator field rheostat GR, so that the generator is in a condition for building up and restoring the generator voltage. This, in turn, builds up the motor shunt field and brings the motor to rest. If the generator shunt field circuit opens so that relay SR cannot apply full voltage to the generator field, the voltage will not build up, and relay SR will not pick up, so that the equipment remains inoperative.

While some possibilities of modifying a variable voltage drive according to the invention have been mentioned in the foregoing, it will be understood by those skilled in the art that other changes can be applied without departing from the spirit and essential features of the invention as set forth in the claims appended hereto.

We claim as our invention:

1. A variable voltage drive comprising a generator having an armature and a field winding, a drive motor and selective control means for reversibly connecting said motor to said armature, selectively adjustable impedance means arranged for connection with said field winding for varying the excitation of said winding and thereby the working voltage of said armature within a given range of voltage values, and voltage responsive relay means connected to said armature for controlling the connection of said impedance means with said winding, said relay means having a pick-up voltage value above said voltage range and a drop-off voltage value below said range so as to provide higher than working excitation for said winding when the voltage of said armature, while building up, stays below said pick-up value and when said armature voltage, while decreasing, subsides below said drop-off value.

2. A variable voltage drive comprising a generator having an armature and a field winding, a drive motor and selective control means for reversibly connecting said motor to said armature, adjustable impedance means arranged for connection with said field winding for varying the excitation of said winding in order to select a working value of the voltage generated in said armature, within a given voltage range, and voltage responsive relay means connected to said armature for controlling the connection of said impedance means with said winding, said relay means having a pick-up voltage value above said range and a drop-off voltage value below said range so as to render said impedance means inoperative in order to provide said winding with more than working excitation when the voltage of said armature, while building up, stays below said pick-up value and when said armature voltage, while decreasing, subsides below said drop-off value.

3. A variable voltage drive comprising a generator having an armature for producing adjustable generator voltage and a field winding arranged in shunt relation to said armature, a motor connected to said armature for operating at a speed determined by said voltage, adjustable impedance means arranged in series with said field winding for adjusting said voltage within a given range of working voltages, and voltage responsive relay means connected to said armature for controlling the connection of said impedance means with said winding, said relay means having a pick-up voltage value above said range and a drop-off voltage value below said range for rendering said impedance means inoperative so as to provide higher than working excitation for said winding when the voltage of said armature, while building up, stays below said pick-up value and when said armature voltage, while decreasing, drops below said drop-off value.

4. A variable voltage drive comprising a generator having an armature for producing adjustable generator voltage and a shunt field winding, a drive motor having an armature circuit, motor control means for connecting said armature circuit to said generator armature in order to operate said motor at a speed determined by the value of said voltage, adjustable impedance means in connection with said shunt field winding for controlling its excitation in order to adjust said voltage value, control means responsive to the voltage of said armature for controlling the interconnection of said impedance means and shunt field winding so as to maintain maximum excitation of said shunt field winding when said armature voltage is below a given building-up value and to reduce said excitation to the value determined by the adjustment of said impedance means after said armature voltage has reached said given value, and interlock means connecting said voltage responsive control means with said motor control means so as to prevent operation of said motor before said excitation is reduced by said voltage responsive control means.

5. A variable voltage drive comprising a generator having an armature for producing adjustable generator voltage and a shunt field winding, a drive motor having an armature circuit, motor control means for connecting said armature circuit to said generator armature in order to operate said motor at a speed determined by the value of said voltage, adjustable impedance means in connection with said shunt field winding for controlling its excitation in order to adjust said voltage value, control means responsive to the voltage of said armature for controlling the interconnection of said impedance means and shunt field winding so as to provide more than working excitation for said shunt field winding when said armature voltage is below a given building-up value while reducing, after said armature voltage has reached said given building up value, said excitation to a minimum working value determined by the maximum impedance value of said impedance means, interlock means connecting said voltage responsive control means with said motor control means so as to prevent operation of said motor before said excitation is reduced by said voltage responsive control means, and circuit means disposed between said impedance means and said motor control means and controlled by the latter for changing said excitation to a working value selected by the adjustment of said impedance means when said motor is in operation.

6. A variable voltage drive comprising a generator having an armature for producing adjustable generator voltage and a field winding, a motor arranged for operation at a speed determined by said voltage, adjustable impedance means connected with said field winding for adjusting said voltage and having selector means for adjusting a working impedance value between the maximum and a minimum impedance value corresponding to given low and high values respectively of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value while establishing maximum impedance after said pick-up value is exceeded and before said generator voltage, when decreasing, subsides below said drop-off value, and selective motor control means disposed for reversibly energizing said motor by said generator voltage and connected with said impedance means for establishing said selected working impedance value when said motor is in operation.

7. A variable voltage drive comprising a generator having an armature for producing adjustable generator voltage and a field winding arranged in shunt relation to said armature, a motor connected to said armature for operating at a speed determined by said voltage, adjustable impedance means arranged in series with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and maximum impedance after said pick-up value is exceeded and before said generator voltage, when decreasing, subsides below said drop-off value, and reversible contact means disposed between said motor and generator for reversibly operating said motor under energization by said generator voltage and being connected with said impedance means for establishing said selected working impedance value when said motor is in operation.

8. A variable voltage drive comprising a generator having an armature for producing adjustable generator voltage and a field winding arranged in shunt relation to said armature, a motor connected to said armature for operating at a speed determined by said voltage, adjustable impedance means arranged in series with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and maximum impedance once said pick-up value is exceeded and before said generator voltage, when decreasing, subsides below said drop-off value, motor control means disposed for energizing said motor by said generator voltage and connected with said impedance means for establishing said selected working impedance value when said motor is in operation, said motor control means being interlocked with said voltage responsive control means so as to permit operating said motor only when said latter control means are in picked-up condition.

9. A variable voltage drive comprising a generator having an armature for producing adjustable generator voltage and a field winding arranged in shunt relation to said armature, a motor connected to said armature for operating at a speed determined by said voltage, adjustable impedance means arranged in series with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and maximum impedance once said pick-up value is reached and before said generator voltage, when decreasing, subsides below said drop-off value, motor control means disposed for energizing said motor by said generator voltage and connected with said impedance means for establishing said selected working impedance value when said motor is caused to operate by said motor control means, and inching control means disposed for energizing said motor by said generator voltage and connected with said impedance means so as to establish said maximum impedance value during inching operations.

10. A variable voltage drive comprising a generator having an armature for producing adjustable generator voltage and a field winding, a motor connected to said armature for operating at a speed determined by said voltage, adjustable impedance means connected with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and maximum impedance once said pick-up value is reached and before said generator voltage, when decreasing, subsides below said drop-off value, motor control means disposed for energizing said motor by said generator voltage and connected with said impedance means for establishing said selected working impedance value when said motor is caused to operate by said motor control means, inching control means disposed for energizing said motor by said generator voltage and connected with said impedance means so as to establish said maximum impedance value during inching operations, and interlock means controlled by said voltage responsive control means and connected with said motor control means and inching control means for preventing the two latter means from operating said motor when said voltage responsive control means are in dropped-off condition.

11. A variable voltage drive comprising a generator having an armature for producing adjustable generator voltage and a field winding, a motor connected to said armature for operating at a speed determined by said voltage, adjustable impedance means connected with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and after said generator voltage, when decreasing, subsides below said drop-off value, motor control means disposed for energizing said motor by said generator voltage and connected with said impedance means for establishing said selected working impedance value when said motor is in operation, said motor control means being interlocked by said voltage responsive control means so as to permit operating said motor only when said latter control means are in picked-up condition, dynamic braking means including a resistor, and means under control by said motor control means for connecting said resistor in parallel to said motor only when said motor control means are in inoperative condition.

12. A variable voltage drive comprising a generator having an armature for producing adjustable generator voltage and a field winding, a motor connected to said armature for operating at a speed determined by said voltage, adjustable impedance means connected with said field winding for adjusting said voltage and having selector means for adjusting a working impedance value between a maximum and a minimum impedance value corresponding to respective low and high values of said voltage, voltage responsive relay means connected to said armature for controlling the connection of said impedance means with said winding and having a pick-up voltage value above said high voltage value and a drop-off voltage value below said low voltage value for establishing minimum impedance before said generator voltage, when building up, reaches said pick-up value and maximum impedance thereafter and before said generator voltage, when decreasing, subsides below said drop-off value, motor control means disposed for energizing said motor by said generator voltage and connected with said impedance means for establishing said selected working impedance value when said motor is caused to operate by said motor control means, inching control means disposed for energizing said motor by said generator voltage and connected with said impedance means so as to establish said maximum impedance value during inching operations, interlock means controlled by said voltage responsive control means and connected with said motor control means and inching control means for preventing the two latter means from operating said motor when said voltage responsive control means are in dropped-off condition, a dynamic braking resistor connected in parallel to said motor, and means under control by said motor control means and said inching control means for disconnecting said resistor when said motor is energized by either of said latter two means.

13. A variable voltage drive comprising a generator having an armature for producing adjustable generator voltage and a shunt field winding, a drive motor having an armature and a shunt field winding disposed for connection to said generator, two adjustable resistance devices connected with said respective shunt field windings and having interconnected adjusting members respectively for simultaneously adjusting the excitation of said field windings in accordance with a selected motor speed, a voltage responsive relay connected across said generator armature for controlling the connection of said generator field winding with said appertaining resistance device so as to short circuit said latter device during starting operation of said generator, another relay connected between said generator and said motor for shorting said other device, and reversible motor control means disposed for reversibly energizing said motor by said generator voltage and connected with said resistance devices so as to operate said motor at said selected speed, said other relay being connected with said motor control means so as to short said other device only when said motor is not energized by said motor control means.

WILLIAM H. FORMHALS.
GEORGE E. KING.